(12) United States Patent
Williams et al.

(10) Patent No.: US 9,767,440 B2
(45) Date of Patent: Sep. 19, 2017

(54) SYSTEM AND METHOD FOR STUDENT ATTENDANCE MANAGEMENT

(71) Applicant: SCHOOL INNOVATIONS & ACHIEVEMENT, INC., El Dorado Hills, CA (US)

(72) Inventors: Jeffrey C Williams, El Dorado Hills, CA (US); Susan Cook, Rio Linda, CA (US)

(73) Assignee: SCHOOL INNOVATIONS & ACHIEVEMENT, INC., El Dorado Hills, CA (US)

( * ) Notice: Subject to any disclaimer, the term of this patent is extended or adjusted under 35 U.S.C. 154(b) by 261 days.

(21) Appl. No.: 14/250,314

(22) Filed: Apr. 10, 2014

(65) Prior Publication Data

US 2015/0294274 A1 Oct. 15, 2015

(51) Int. Cl.
| | | |
|---|---|---|
| *G06Q 10/00* | (2012.01) | |
| *G06Q 50/00* | (2012.01) | |
| *G06Q 10/10* | (2012.01) | |
| *G06Q 50/20* | (2012.01) | |
| *G06Q 10/06* | (2012.01) | |

(52) U.S. Cl.
CPC ......... *G06Q 10/1095* (2013.01); *G06Q 50/20* (2013.01); *G06Q 10/06311* (2013.01); *G06Q 50/00* (2013.01); *G06Q 50/205* (2013.01)

(58) Field of Classification Search
CPC ....................... G06Q 10/06311; G06Q 50/205
USPC ................................................ 705/7.13, 326
See application file for complete search history.

(56) References Cited

U.S. PATENT DOCUMENTS

| | | | | |
|---|---|---|---|---|
| 2002/0178038 | A1* | 11/2002 | Grybas | G06Q 10/10 705/326 |
| 2004/0110119 | A1* | 6/2004 | Riconda | G09B 7/02 434/350 |
| 2005/0233294 | A1* | 10/2005 | Keitch | G09B 19/00 434/350 |
| 2006/0127870 | A1 | 6/2006 | Fields et al. | |
| 2007/0134642 | A1 | 6/2007 | Chuah | |
| 2012/0150797 | A1* | 6/2012 | Landy | G06F 17/30563 707/610 |
| 2015/0120362 | A1* | 4/2015 | Whorley, Jr. | G06Q 50/205 705/7.19 |

(Continued)

*Primary Examiner* — Sujay Koneru
(74) *Attorney, Agent, or Firm* — Inventive Patent Law P.C.; Jim H. Salter

(57) ABSTRACT

A system and method for student attendance management are disclosed. A particular embodiment includes: installing a site-resident data collection module in a site location; using the site-resident data collection module to collect student information, attendance data, and other site data from the site location; transferring the site data to a host location; performing data transformation and normalization operations on the site data to convert the site data to a common format, the data transformation and normalization operations including district-specific data transformation rules; performing district configuration operations to configure rules specifying how and when alerts can be sent to recipients based on the site data; and performing scheduling and reporting operations to generate and distribute alerts, including attendance letters, to recipients based on the site data and the configured rules.

20 Claims, 9 Drawing Sheets

(56) References Cited

U.S. PATENT DOCUMENTS

2015/0296347 A1\* 10/2015 Roth .................... G06Q 50/205
                                                                       705/326

\* cited by examiner

SYSTEM AND METHOD FOR STUDENT ATTENDANCE MANAGEMENT

TECHNICAL FIELD

This patent application relates to computer-implemented software and networked systems, according to one embodiment, and more specifically to a system and method for student attendance management.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2012-2014 School Innovations & Achievement Inc., All Rights Reserved.

BACKGROUND

In recent years, numerous states have passed laws requiring school districts to more closely monitor student attendance and truancy. This includes monitoring students who are chronically truant and frequently absent from the classroom. Many school districts are instituting new policies regarding permitted absenteeism and redefining unacceptable truancy. These laws and policies require that schools take certain specified actions immediately upon a student reaching a threshold of unacceptable truancy. However, due to lack of funding, shortage of personnel, and lack of availability of sophisticated technology, most schools and school districts are ill-equipped to compare, analyze and measure the effectiveness with the goal of improving student attendance.

Additionally, each school within a school district can track attendance in a different manner, using different absence codes. Further, schools across a school district do not always label an "unexcused absence" as recognized by state law or school district policy as an absence, but rather as a tardy, late arrival, early dismissal, and medical excuse without documentation, among others. Such variance among attendance tracking also makes it nearly impossible for school districts to correctly track truancy and take appropriate, timely action as required by their own policies and by state law.

Finally, monetary incentives, reimbursements and other funding for schools are often linked in one way or another to student enrollment and attendance. Thus, districts unable to implement systems for reliable and continuous attendance tracking will be unable to maximize the monetary benefits received.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
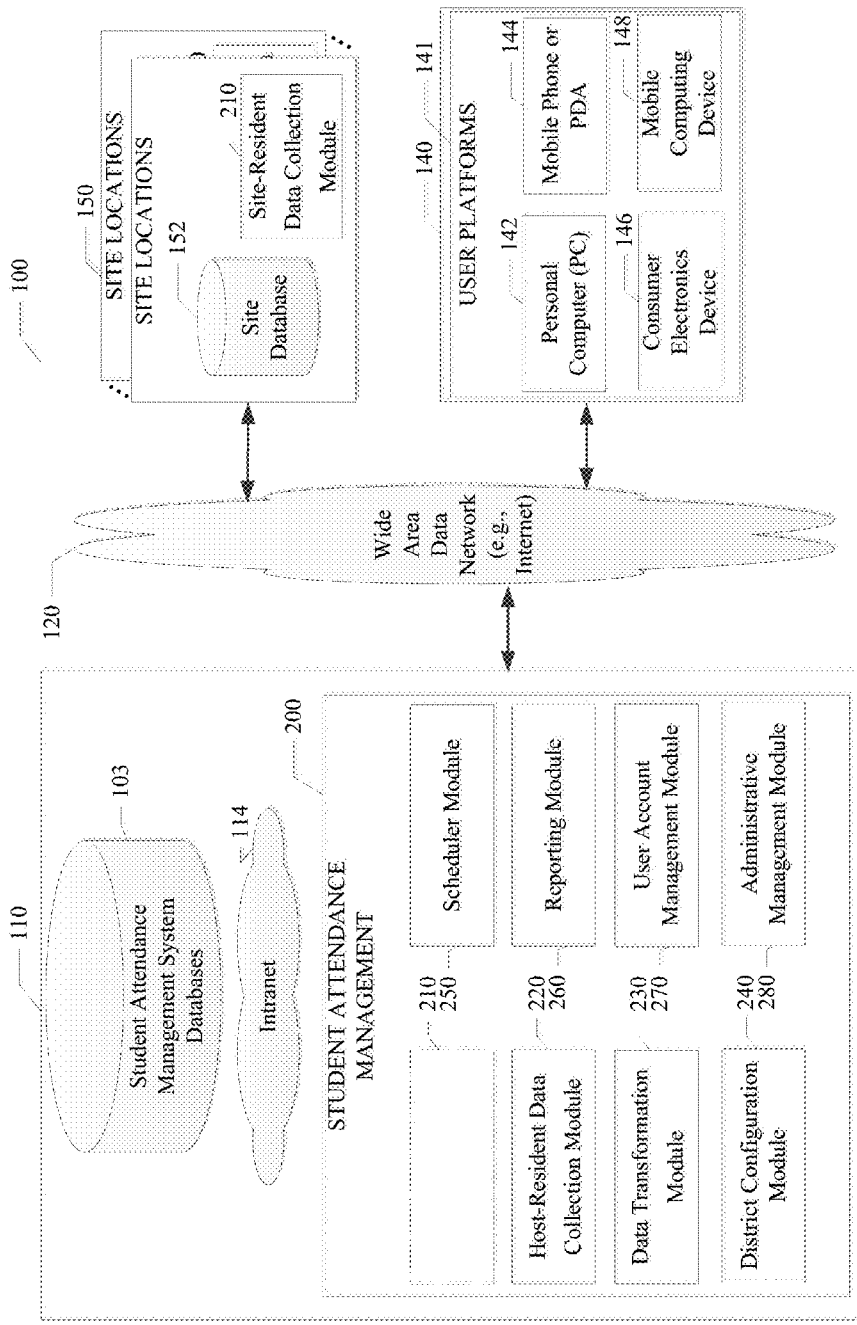
FIG. 1 illustrates an example embodiment of a student attendance management system in a network-enabled ecosystem.

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for student attendance management are disclosed. The various embodiments provide the ability to detect chronic absenteeism early, and then intervene or deter chronic absenteeism before it affects monetary distributions or results in drop out, which would otherwise result in decreased enrollment (also negatively impacting a school's financial resources). The various embodiments also standardize absence records of all schools within a school district and all districts in a given area, automatically track absences on a daily basis, and provide automatic and prompt notification when an individual student's truancy reaches a threshold requiring a response.

In various embodiments described in detail below, a software application program is used to gather, process, and distribute school information, including attendance data, using a computer system, a web appliance, and/or a mobile device. As described in more detail below, the computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, set-top boxes, consumer electronic devices, or any other type of computing, data processing, communication, networking, or electronic system.

Overview of an Example Embodiment

An example embodiment as described herein is a student attendance management network focused on the gathering, processing, and distribution of school information, including attendance data. The processing of the school district data can prevent or substantially reduce future K-12 student absences. In the embodiments described herein, there is a consistent, defined process that when followed, dramatically reduces the number of student absences. This process uses a combination of student data collected at the school sites, customized database scripts, custom application code, and letter printing processes. This process as a whole is referred to as Attention2Attendance or A2A.

In the example embodiments described herein, data is extracted from the school student information systems using a site-resident data collection module. This data can be extracted using pre-defined database select and join statements allowing the relevant student information to be accessed and retrieved. This data is then transferred to a host system using the site-resident data collection module and a host-resident data collection module as described in more detail below.

At the host site, the school student information can be normalized and otherwise transformed into a consistent form. A data transformation module uses customized rules and processes to aggregate the data into a common format. Because each school district can uniquely set up and store their data, this normalization and data transformation process is specific for each district. The normalized data is then uploaded into host databases. This upload can use standard database scripts and processes. The databases described herein can be implemented using well-known applications or systems, such as Microsoft® Access or Excel, SQL, spreadsheets, tables, flat files, or any other type of structured data storage.

Once the normalized school student information is resident in the host database, the scheduler and reporting modules of an example embodiment can be used to generate notifications based on prescribed rules. In a particular embodiment, specific rules and alerts can be set up within the student attendance management system to identify trends, events, and instances when a student, a school, or a district should be notified of an identified situation. These notifications are the drivers for improving school attendance. The specific rules and alerts can be pre-defined within the student attendance management system application. These rules and alerts can be customized to address specific school district needs if requested. In some cases, some notifications can be suppressed or delayed to implement a pre-defined policy. In most cases, the notifications are sent on regular intervals to ensure consistency. A district configuration module can be used to specify the particular rules and processes used to generate and distribute notifications. For example, the manner of distribution (e.g., physical letter, email, or the like) can be pre-defined in a configurable way.

Detail of an Example Embodiment

Referring now to FIG. 1, in an example embodiment, a system for student attendance management 100 in a network-enabled ecosystem is disclosed. In various example embodiments, an application or service, typically provided by or operating on a host site (e.g., a website) 110, is provided to simplify and facilitate the downloading or hosted use of the student attendance management system 200 of an example embodiment. In a particular embodiment, the student attendance management system 200, or a portion thereof, can be downloaded from the host site 110 by a user at a user platform 140. Alternatively, the student attendance management system 200 can be hosted by the host site 110 for a networked user at a user platform 140. The details of the student attendance management system 200 of an example embodiment are provided below.

Referring again to FIG. 1, the student attendance management system 200 can be in network communication with a plurality of user platforms 140. The host site 110 and user platforms 140 may communicate and transfer data and information in the data network ecosystem 100 shown in FIG. 1 via a wide area data network (e.g., the Internet) 120.

Various components of the host site 110 can also communicate internally via a conventional intranet or local area network (LAN) 114.

In an example embodiment, the student attendance management system 200 can also be in network communication with a plurality of site locations 150. Site locations 150 can represent school district offices or school administrative offices where student information and attendance data is stored in site databases. As conventionally done in existing schools and district offices, student attendance data is recorded in site databases 152. Unfortunately, the attendance data in these site databases can be inaccurate, incomplete, recorded in non-standard data formats, recorded in non-standard data structures or databases, or otherwise rendered very difficult to reconcile and combine with data from other sites. As described in more detail below, the various embodiments disclosed herein can retrieve, reformat, re-structure, and process the site data to produce useful information aggregated among a plurality of districts, schools, and other site locations.

Networks 120 and 114 are configured to couple one computing device with another computing device. Networks 120 and 114 may be enabled to employ any form of computer readable media for communicating information from one electronic device to another. Network 120 can include the Internet in addition to LAN 114, wide area networks (WANs), direct connections, such as through an Ethernet port or a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth, satellite, or modem and temporary telephone link.

Networks 120 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 120 and 114 may also include an autonomous system of terminals, gateways, routers, and the like connected by wireless radio links or wireless transceivers. These connectors may be configured to move freely and randomly and organize themselves arbitrarily, such that the topology of networks 120 and 114 may change rapidly and arbitrarily.

Networks 120 and 114 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as one or more of client devices 141, with various degrees of mobility. For example, networks 120 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 120 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 120 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The student attendance management system can be implemented using any form of network transportable digital data. The network transportable digital data can be transported in any of a group of file formats, protocols, and associated mechanisms usable to enable a host site 110 and a user platform 140 to transfer data over a network 120. In one embodiment, the data format for the user interface can be HyperText Markup Language (HTML). HTML is a common markup language for creating web pages and other information that can be displayed in a web browser. In another embodiment, the data format for the user interface can be Extensible Markup Language (XML). XML is a markup language that defines a set of rules for encoding interfaces or documents in a format that is both human-readable and machine-readable. In another embodiment, a JSON (JavaScript Object Notation) format can be used to stream the interface content to the various user platform 140 devices. JSON is a text-based open standard designed for human-readable data interchange. The JSON format is often used for serializing and transmitting structured data over a network connection. JSON can be used in an embodiment to transmit data between a server, device, or application, wherein JSON serves as an alternative to XML. The Hypertext Transfer Protocol (HTTP) or secure HTTP (HTTPS) can be used as a network data communication protocol.

In a particular embodiment, a user platform 140 with one or more client devices 141 enables a user to access data and provide data and/or instructions for the student attendance management system 200 via the host 110 and network 120. Client devices 141 may include virtually any computing device that is configured to send and receive information over a network, such as network 120. Such client devices 141 may include portable devices 144, such as, cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. Client devices 141 may also include other computing devices, such as personal computers 142, multiprocessor systems, microprocessor-based or programmable consumer electronics, network PC's, and the like. Client devices 141 may also include other processing devices, such as consumer electronic (CE) devices 146 and/or mobile computing devices 148, which are known to those of ordinary skill in the art. As such, client devices 141 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and many lines of color LCD display in which both text and graphics may be displayed.

Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and/or send digital information. In other embodiments, mobile devices can be configured with applications (apps) with which the functionality described herein can be implemented.

Client devices 141 may also include at least one client application that is configured to send and receive content data or/and control data from another computing device via a wired or wireless network transmission. The client application may include a capability to provide and receive textual data, graphical data, video data, audio data, and the like. Moreover, client devices 141 may be further configured to communicate and/or receive a message, such as through an email application, a Short Message Service (SMS), direct messaging (e.g., Twitter), Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

As one option, the student attendance management system 200, or a portion thereof, can be downloaded to a user device 141 of user platform 140 and executed locally on a user device 141. The downloading of the student attendance management system 200 application (or a portion thereof) can be accomplished using conventional software downloading functionality. As a second option, the student attendance management system 200 can be hosted by the host site 110 and executed remotely, from the user's perspective, on host system 110. In one embodiment, the student attendance management system 200 can be implemented as a service in a service-oriented architecture (SOA) or in a Software-as-a-Service (SAAS) architecture. In any case, the functionality performed by the student attendance management system 200 is as described herein, whether the application is executed locally or remotely, relative to the user.

Referring again to FIG. 1, the host site 110 and student attendance management system 200 of an example embodiment is shown to include a student attendance management system database 103. The database 103 is used in an example embodiment for data storage of information related to district records, school records, student records, attendance data, letter templates, calendar data, configuration data, scheduling data, reporting data, and the like. It will be apparent to those of ordinary skill in the art that the database 103 can represent multiple datasets and can be used for the storage of a variety of data in support of the student attendance management system 200 of an example embodiment.

Figure 2:
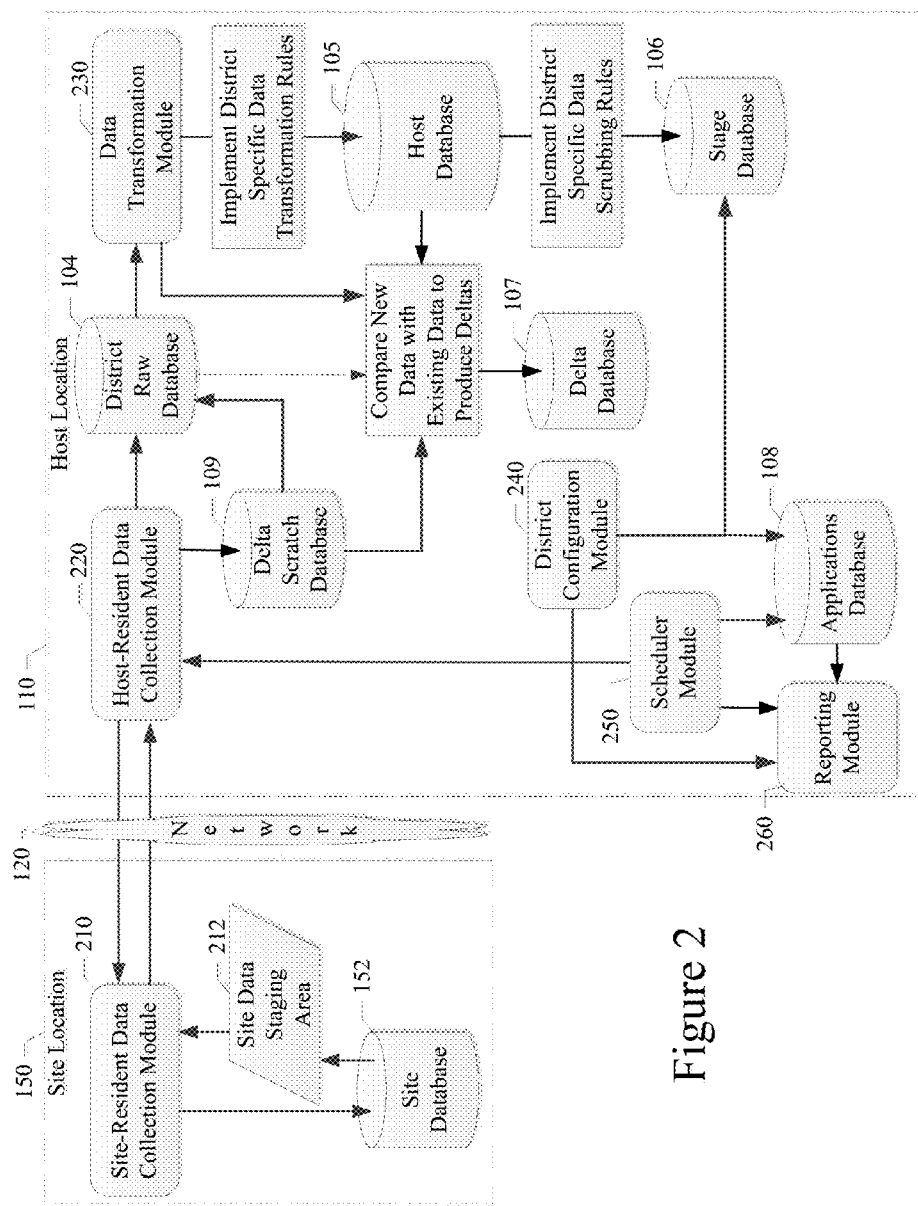
FIG. 2 illustrates an example embodiment of the student attendance management system including a site-resident data collection module configured to execute within an executable environment of a site location.

Referring again to FIG. 1, host site 110 of an example embodiment is shown to include student attendance management system 200. Student attendance management system 200 can include a site-resident data collection module 210, a host-resident data collection module 220, a data transformation module 230, a district configuration module 240, a scheduler module 250, a reporting module 260, a user account management module 270, and an administrative management module 280. Each of these modules can be implemented as software components executing within an executable environment of student attendance management system 200 operating on host site 110 or user platform 140. As shown in FIGS. 1 and 2, the site-resident data collection module 210 of an example embodiment can be configured to execute within an executable environment of site location 150. Each of these modules of an example embodiment is described in more detail below in connection with the figures provided herein.

Referring to FIGS. 1 and 2, the student attendance management system 200 of an example embodiment can include a site-resident data collection module 210. As described above, the site-resident data collection module 210 of an example embodiment can be configured to execute within an executable environment of site location 150. The site-resident data collection module 210 is configured to interface with a legacy system running at a particular district site or school location 150. The site-specific legacy system performs the standard collection and processing of student information and attendance data for the specific site and stores the data in a site database 152. Because the site-specific data stored in the site database 152 can be in an arbitrary format, incomplete, or inaccurate, the site-resident data collection module 210 is used to extract, collect, and marshal the site-specific data for transfer to the host-resident data collection module 220. In an example embodiment, the site-resident data collection module 210 can be a downloaded or otherwise installed executable that runs on the legacy system at a particular district site or school location 150. The site-resident data collection module 210 can also be a pre-installed executable, a dynamically installed plug-in, a mobile application (app), or a dynamically linked element that runs on the legacy system at a particular district site or school location 150. The site-resident data collection module 210 can be configured to check and verify that needed processing and memory space is available on the site's legacy system. Once the site-resident data collection module 210 is up and running on the site system, the site-resident data collection module 210 can access the site database 152 and validate and review the data structures and schema being used in the site database 152. In this manner, the site-resident data collection module 210 can dynamically determine the database record structures and record attributes being used for the particular site. Once the site database 152 structure is determined, the site-resident data collection module 210 can run a test data request with a configurable XML extraction document. The test data request can be configured by an administrator at the site or at the host location. The test data request is used to confirm that the site database 152 structure has been properly determined by the site-resident data collection module 210. At the conclusion of this test, the site-resident data collection module 210 is ready to begin transferring site-specific data to the host location 110.

Referring again to FIGS. 1 and 2, the student attendance management system 200 of an example embodiment can include a host-resident data collection module 220. The host-resident data collection module 220 cooperates with the site-resident data collection module 210 to periodically transfer site-specific data to the host location 110. The host-resident data collection module 220 and the site-resident data collection module 210 can be configured to wake up at pre-determined times to transfer any data updates that may have occurred since the prior data transfer. In this manner, the host location 110 and the host-resident data collection module 220 therein can receive timely updates of student and attendance information being changed at a particular site. These updates can occur with little, if any, involvement by site-specific resources.

The site-resident data collection module 210 can be configured to interface with and collect data from a wide variety of different site-specific legacy systems. Such legacy systems can be hosted, non-hosted, distributed, internal systems, and/or the like. The site-resident data collection module 210 can collect the data in a site data staging area 212, where the data is encrypted, zipped, and delivered to the host-resident data collection module 220 via a secure network 120 connection (e.g., HTTPS). In one embodiment, the data can be delivered to the host-resident data collection module 220 via an encrypted data file.

The site-resident data collection module 210 can be configured to receive a request from the host-resident data collection module 220 for an immediate data update. In this way, the host-resident data collection module 220 can trigger an ad hoc data update from the site location 150 at a time of the host location's 110 choosing. Thus, as described above, the site-resident data collection module 210 and the host-resident data collection module 220 can operate collaboratively to effect the transfer of raw site-specific data from the site location 150 and the site database 152 therein to the host location 110. This raw site-specific data (denoted herein as raw district data) can be transferred to a district raw database 104 and a delta scratch database 109 at host location 110 by the host-resident data collection module 220. In the example embodiment, the raw district data can be decompressed, decrypted, and stored in district raw database 104 and made available to the other processing modules of host location 110. The data in the delta scratch database 109 can be used in the process to identify changes in the received data. At each data collection interval, each new set of raw district data can replace and overwrite a prior set of raw district data stored in district raw database 104 and delta scratch database 109.

Referring again to FIGS. 1 and 2, the student attendance management system 200 of an example embodiment can include a data transformation module 230. The data transformation module 230 has access to the raw district data stored in district raw database 104. The raw district data can comprise student information, attendance data, school or district information, and other information specific to site location 150. Because this raw district data can be in an arbitrary format, incomplete, or inaccurate, the data transformation module 230 is used to normalize and otherwise transform the raw district data into a consistent form. The data transformation module 230 can be configured to use customized rules and processes to aggregate the raw district data into a common format. Because each school district can uniquely set up and store their data, this normalization and data transformation process is specific for each district or school. The normalized data is then uploaded into host databases, such as host database 105.

In an example embodiment, the data transformation module 230 can compare a newly received set of data stored in district raw database 104 and delta scratch database 109 against a corresponding set of data previously received from the same site location 150 and stored in database 105. This comparison can result in a set of differences or deltas (e.g., a configurable delta row key map) that define the data elements that have changed from a previous data update. These deltas can be stored in a delta database 107. Additionally, the data transformation module 230 can also aggregate the set of raw district data stored in district raw database 104 and implement district-specific data transformation rules to normalize the data and store the processed district data into the host database 105. In an example embodiment, these district-specific data transformation rules can be implemented as configurable join rules. The district-specific data transformation rules in an example embodiment are described in more detail below.

In an example embodiment, the data transformation module 230 can implement district-specific data transformation rules to validate and normalize the raw district data received from a site location 150. For example, the data transformation module 230 can implement rules to test the data for particular conditions known to require intervention by remedial software or host administrative personnel. These validation tests can include the following:

- Do both Student and Attendance tables contain all the site codes expected? If not, troubleshoot with Software Engineer, Implementation Coordinator, and district Information Technologists (IT) as needed.
- Are there any configuration codes present that were not accounted for in the configuration files received previously? If so, inform Implementation Coordinator.
- Has attendance data for all sites been received as expected? If not, troubleshoot with Software Engineer, Implementation Coordinator, and district IT as needed.
- Examine Period Frequency table and determine if any Validation rules will need to be created, such as moving attendance data from one of the periods to the AllDay-Code field for the Elementary sites (most common example).
- Review the raw district data received from a site location 150 for particular values that may be indicative of validation issues. Validation of these particular values can include the following:
  - Missing Sites—This means data for one or more sites that is expected was not received.
  - Non-Configured Codes—This means some type of code (e.g., language, ethnicity, grade, attendance) is showing up in the data and is not defined. Attendance & Language codes could affect letter production.
  - Attendance on Holidays and Weekends—This means the received raw data is showing attendance on a date that is configured in the Scheduler as a district non-school day. This is rarely anything other than accidental pre-filled attendance.
  - Total Attendance Record count—This should show a steady pattern of attendance up through the data the data was pulled for all active sites.
  - Active Student Count by Site—This should show relatively similar student counts per site type.
  - Ethnicity—The ethnic breakdown should be as expected (e.g., are there missing ethnicities).
  - Attendance Outside School Year—There should be no attendance showing up outside of the school year
  - Student Entry Dates>School Year End Date—There should be none or very few students (pre-enrolls) with entry dates after the end of the current school year.
  - Upload Summary—Any upload errors will need to be investigated in a Batch Services process.
  - Attendance at Non-Participating Sites—There should not be any attendance showing up for non-participating sites.
  - Letter Count—Most sites should produce letters. Any sites that don't produce letters should be investigated to be sure their configuration is correct and none of their students should be triggering any letters yet.
- Exit date before entry date
- Valid email addresses
- Valid Names As the data transformation module 230 implements the district-specific data transformation rules, such as those described above, sites that send raw district data with validation errors can be flagged. At a designated time, the flagged sites can be sent alerts notifying them of the data discrepancies.

The particular validation and normalization rules used by the data transformation module 230 can be configured and/or modified using a particular user interface provided by the district configuration module 240. The district configuration module 240 is described in more detail below. Once the data transformation module 230 validates and normalizes the raw district data, the normalized site data can be uploaded into host database 105. The data transformation module 230 can further implement data scrubbing rules to filter out site data not needed for letter generation, site reporting, or otherwise not needed by the host application. The site data needed for letter generation, site reporting, or otherwise used by the host application can be transferred to the stage database 106. Only site data for active sites is moved to the stage database 106. An additional level of data scrubbing can be performed on the site data in the stage database 106. The resulting data can be transferred to the applications database 108. As described in more detail below, the validated, normalized, filtered, and scrubbed site data in the applications database 108 can be used by the district configuration module 240, the scheduler module 250, and the reporting module 260 to generate appropriate attendance letters and notifications to students, site administrative personnel, and third-party administrators as needed.

Referring again to FIGS. 1 and 2, the student attendance management system 200 of an example embodiment can include a district configuration module 240. In a particular embodiment, specific rules and alerts can be set up within the student attendance management system to identify trends, events, and instances when a student, a school, or a district should be notified of an identified situation. These notifications are the drivers for improving school attendance. The specific rules and alerts, and associated codes and triggers, can be pre-defined within the student attendance management system application. These rules and alerts can be customized to address specific school district needs if requested.

The district configuration module 240 can be used to specify and manage the particular rules and processes used to generate and distribute alerts, such as attendance letters and notifications. For example, the manner of distribution of an attendance letter or notification (e.g., physical letter, email, or the like) can be pre-defined in a configurable way. Additionally, whether a letter or notification is generated at all for a particular student, site administrator, or third party administrator can also be configured. Finally, the content of a letter or notification can be customized for a particular recipient based on a variety of factors that can be encoded into a plurality of codes the district configuration module 240 can make configurable and customizable. In an example embodiment, these codes, triggers, and related data can include the following:

- Ethnicity codes
- Language codes
- Site codes
- Attendance codes—configurable attendance codes that trigger specific letter types
- Grade codes
- Status codes (active/inactive)
- Attendance triggers Attendance follows student from previous site within a district (Follow Me)
Send letters to multiple guardians
Send conference notifications
Exclude sending letters to students under N years of age
Exclude absences that occurred before the student turned N years old.
Exclude sending letters to students over the age of N
Attendance tracking (all day vs. period attendance)
Suppressing letters options
Set number of 'NEW' absences that triggers the next letter.
Letter codes
  Letter types
  Pre-requisite
  Attendance threshold
  Printing of letter
  Emailing of letter
  Generate a conference
  Letter Templates
  Merge Fields
    Logo
    Conference logo
    Return address
    Number of absences in District Policy
Letter Contacts—merge field on printed letter
  Signers
  Contacts The district configuration module 240 provides the ability within the same district school site to set different attendance triggers, letters, and contacts based on grade. For example, grades K-5 can have an attendance trigger based on the all-day attendance code and grades 6-8 have an attendance trigger based on attendance in periods 1-6.

The district configuration module 240 of an example embodiment also provides the ability to configure a letter code to trigger an attendance letter if an event occurs within a designated timeframe, such as a number of days (e.g., school days), weeks (e.g., calendar weeks) or months (e.g., calendar weeks). For example, a code can be configured to trigger an attendance letter on three unexcused absences within a four week period. The district configuration module 240 provides the flexibility to choose when to send subsequent attendance letters. For example, a subsequent attendance letter can be printed only if a pre-requisite letter was printed or a closed conference was completed. For example, a code can be defined to enable a second letter to be printed prior to the first letter being printed, or a code can be defined to disable the printing of a second letter prior to the printing of the first letter. Thus, in a similar manner, a variety of codes, triggers, and rules can be created and managed using the district configuration module 240 of an example embodiment.

Referring again to FIGS. 1 and 2, the student attendance management system 200 of an example embodiment can include a scheduler module 250. Once the normalized school student information is resident in the host database (e.g., applications database 108), the scheduler module 250 and the reporting module 260 of an example embodiment can be used to generate attendance letters, notifications, and other alerts according to a defined schedule and to schedule conferences based on prescribed rules configured using the district configuration module 240. In some cases, some notifications can be suppressed or delayed to implement a pre-defined policy. In most cases, the notifications are sent on regular intervals to ensure consistency.

The scheduler module 250 of an example embodiment can be used to define and manage a schedule for the generation and distribution of alerts, including attendance letters and notifications. In a particular embodiment, the scheduler module 250 can be configured to schedule around U.S. holidays, district events, or host location non-operational days. Additionally, the scheduler module 250 can be configured to schedule in production delays, personnel review/processing delays, data processing delays, mailing delays, and other foreseeable delay scenarios that may affect the production of alerts.

In an example embodiment, the scheduler module 250 can be configured to view a district's schedule for previous fiscal years. A user of the scheduler module 250 can add, delete, and/or edit an attendance letter or notification production schedule. In addition, the scheduler module 250 can impose some limitations on the user's configuration of a production schedule. For example, in a particular embodiment, the following restrictions can be imposed on the user:

When editing a production schedule, a user cannot select a date for a production event if the date falls on a weekend, a US holiday, an important district date, or an important date for the host location.

Cannot schedule a production run with the same attendance data as a previous run through, data processing, client review, or print date.

Users cannot delete a past run without the role 'Can delete past tasks in Scheduler'.

Users with the role 'Can delete past tasks in Scheduler' cannot delete past runs where letters are associated to the run.

Users cannot schedule same day tasks without the role 'Can Schedule same day tasks in Scheduler'.

User has the ability to delete a whole production run (only future production runs unless the user has the role to delete past runs).

Cannot have a production run when the data processing date is less than the previous run's print date.

Cannot have a production run when the Client Review date is before the previous run's print date.

Cannot have a production run when the Attendance Through date is before the previous run's attendance through date.

Thus, using a variety of features and automatically imposed restrictions provided by the scheduler module 250, a user can configure, schedule, and manage production runs for producing alerts or scheduling conferences in an example embodiment. The scheduler module 250 can also be configured to perform several suppression functions. Suppression functions are used by a host administrator to temporarily or permanently prevent the generation and distribution of attendance letters, notifications, or other alerts to particular students, particular schools, particular districts, or other groups or locations. In a particular embodiment, several letter suppression types are supported: 1) One-Time: only suppresses the letter for the current production run, 2) Extended: suppresses a letter for a configured number of additional absences, or 3) Indefinite: suppress a letter for the remainder of the current school year. In addition, the example embodiment can suppress a letter from being generated for a particular student for the current school year.

Referring again to FIGS. 1 and 2, the student attendance management system 200 of an example embodiment can include a reporting module 260. In an example embodiment, the reporting module 260 can be configured to associate a unique student identifier with every student in the host databases 103. This student identifier is unique for a particular student across all districts, schools, and locations serviced by the host system 110. As a result, the student attendance management system 200 can track and report on the same student year over year within the same district, within different districts, and across different States as students move to different locations. This feature of an example embodiment enables better tracking of students over time, even if students change locations, addresses, or names.

The reporting module 260 is used to generate reports, attendance letters, notifications, other alerts, or schedule conferences according to the schedule configured using the scheduler module 250. In an example embodiment, the reporting module 260 can access the data in the applications database 108, or other host databases 103, to generate reports that highlight trends in student attendance for a variety of comparative factors, including: trends for particular students or student groups, trends qualified by student demographic factors, trends qualified by time periods, trends qualified by historical data vs. current data, trends by location, district, school, or State, trends qualified by funding levels, and a variety of other reports generated from the attendance and student data maintained in the host databases 103. As a result, the student attendance management system 200, and the reporting module 260 in particular, can produce a wealth of attendance information aggregated across wide variations in time and location. For example, a particular embodiment can generate a Save Rate report that highlights the percentage of students that do not continue on a path toward chronic absenteeism after an A2A intervention. The Save Rate report can measure the change in behavior of at-risk students as they are exposed to the benefits of the A2A processes, such as attendance letters and scheduled conferences. In another report, the reporting module 260 can generate a comparative analysis that compares a district's performance in managing student attendance against other districts or regions managed by the student attendance management system 200. In particular, the comparative analysis report can compare a district's performance against a State average of: truancy (unexcused absences), excessive excused absences, and chronic absenteeism.

In an example embodiment, the reporting module 260 can include a user interface for configuring and enhancing the reporting operation. In a particular embodiment, the user interface of the reporting module 260 can be used to add notes to attendance letters, notifications, or other alerts. For example, letter notes can be associated with a specific letter for a student, student notes can be associated with a specific student, and conference notes can be associated with a specific conference for a student. In addition, the user interface of the reporting module 260 can be used to add, edit, or delete guardian information associated with a particular student. The user interface of the reporting module 260 can also be used to configure the manner in which notifications are sent (e.g., by letter, email, or text message).

In a particular embodiment, the user interface of the reporting module 260 in concert with the scheduler module 250 can be used to generate and schedule a conference for particular individuals as part of the A2A attendance management process. For example, an attendance letter, notification, or other alert can be configured to automatically queue a student for conference scheduling when the letter, notification, or other alert is printed. The user interface of the reporting module 260 in concert with the scheduler module 250 can be used to schedule individual conferences or group conferences (e.g., more than one student in a conference). The user interface can also be used to add and edit a conference schedule item, specify a date, time, and location, and configure the reporting module 260 to send a conference notification to a student, parent or guardian, or school/district administrator. The user interface of the reporting module 260 in concert with the scheduler module 250 can also be used to update the status of a scheduled conference, reschedule a conference, or cancel/close a scheduled conference. Upon closing a conference, the user can also add a reason or a note related to the closure of the conference.

Figure 3:
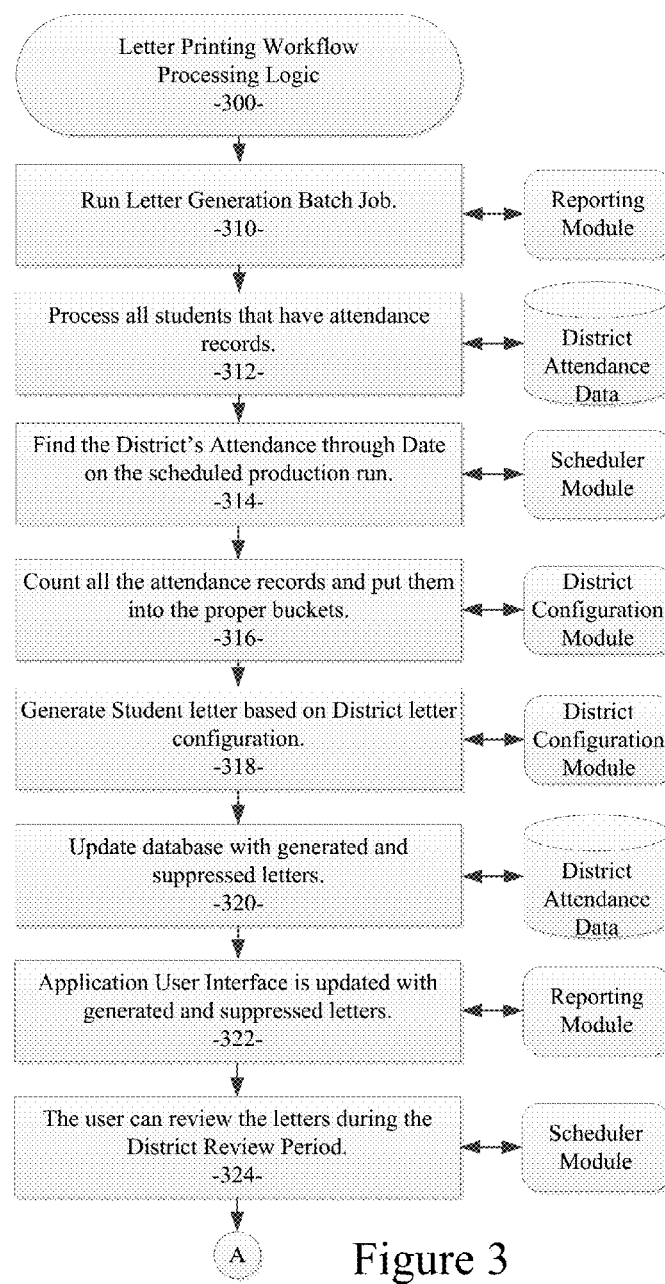
FIGS. 3 and 4 are flow diagrams illustrating the letter printing workflow in an example embodiment.
Figure 4:
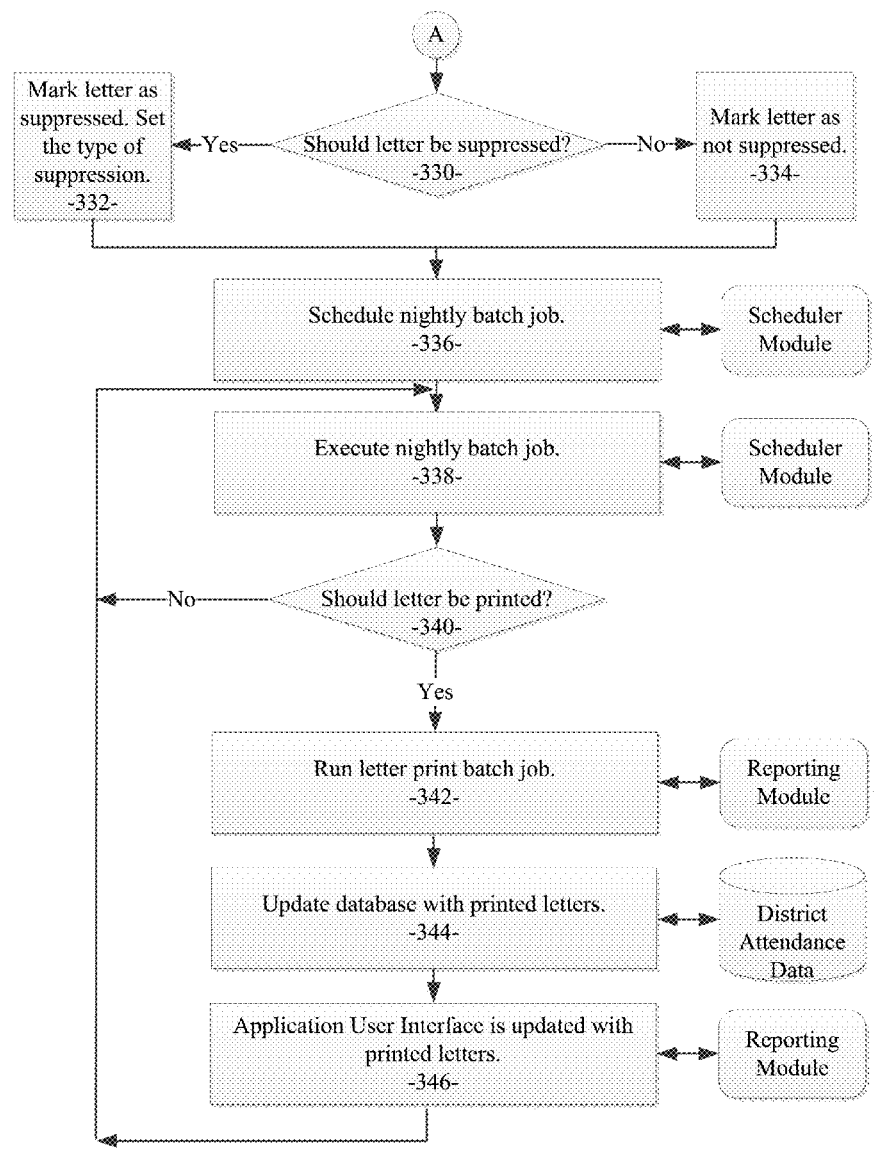

Referring now to FIGS. 3 and 4, a flow diagram illustrates the letter printing workflow in an example embodiment. As described above, the reporting module 260 in concert with the scheduler module 250 and attendance and student data stored in host databases 103 can be used to generate attendance letters, notifications, and other alerts, which can be distributed to students, parents or guardians, and school or district representatives. The letter generation process can be performed in real time or as a batch job run on off-peak hours.

Referring now to FIG. 3, processing starts for the letter printing workflow of an example embodiment. At processing block 310, the workflow process runs a letter generation batch job. The batch job processes all students that have attendance records (processing block 312). The process finds the district's attendance through date on the scheduled production run (processing block 314). All the attendance records are counted and classified into the proper buckets (processing block 316). Student letters are generated based on the district letter configuration (processing block 318). The host database is updated with the generated and suppressed letters (processing block 320). The application user interface is updated with generated and suppressed letters (processing block 322). The user can review the generated letters during a district review period (processing block 324).

Referring now to FIG. 4, processing continues at bubble A for the letter printing workflow of an example embodiment. At decision block 330, a query is processed. Should the letter be suppressed? (decision block 330). If yes, the letter is marked as suppressed. The type of suppression can be set by the user (processing block 332). If no, the letter is marked as not suppressed (processing block 334). Then, the nightly letter processing batch job is scheduled (processing block 336). The nightly letter processing batch job is executed (processing block 338). Should the letter be printed? (decision block 340). If yes, the letter print batch job is run (processing block 342). The host databases are updated with the printed letters (processing block 344). The application user interface is updated with the printed letters (processing block 346). Processing then terminates for the letter printing workflow of an example embodiment.

Figure 5:
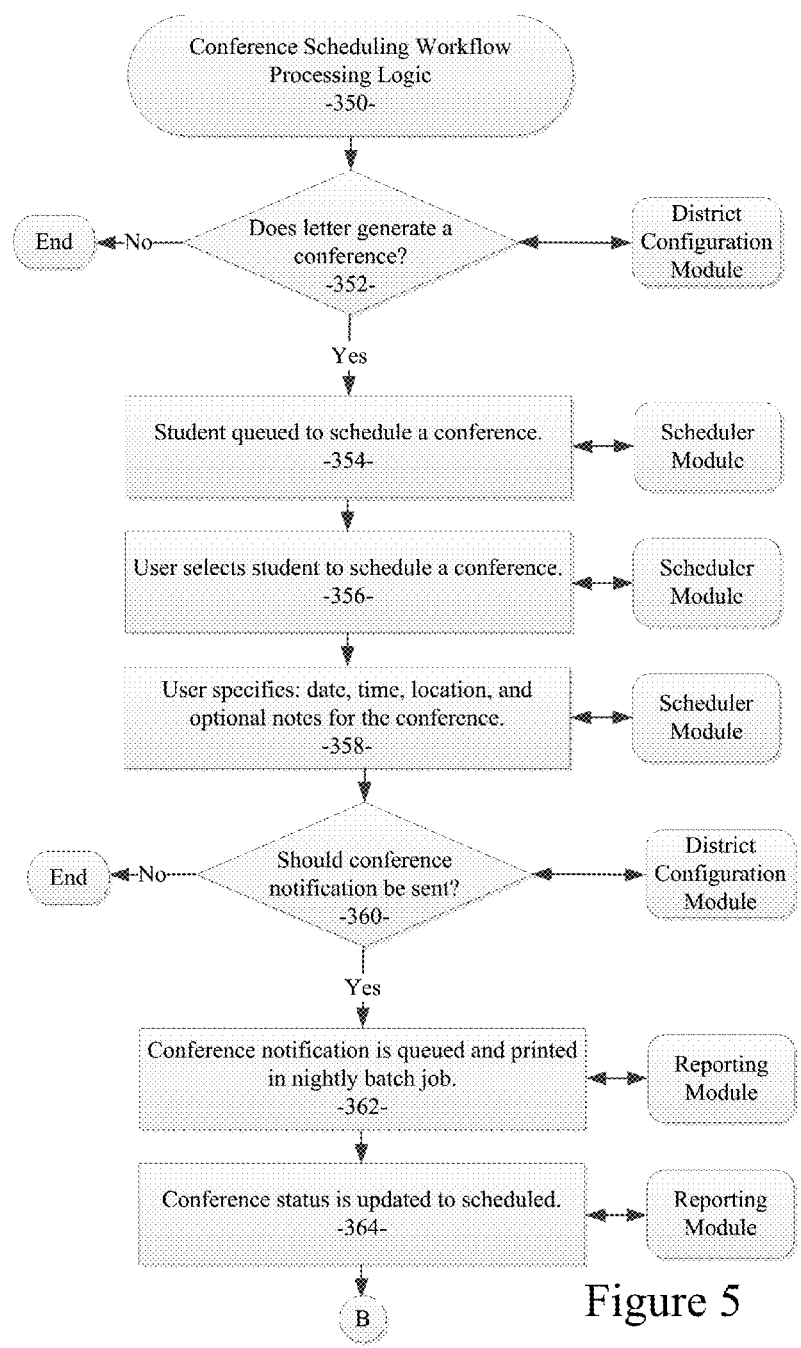
FIGS. 5 and 6 are flow diagrams illustrating the conference scheduling workflow in an example embodiment.
Figure 6:
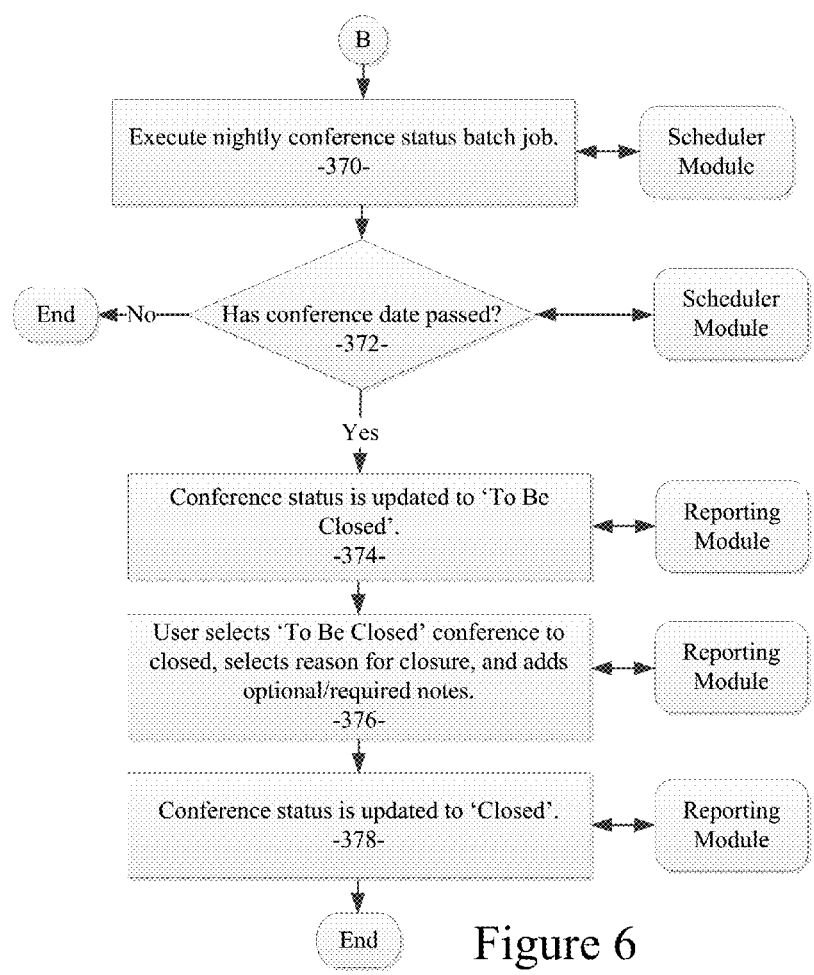

Referring now to FIGS. 5 and 6, a flow diagram illustrates the conference scheduling workflow in an example embodiment. Referring to FIG. 5, processing starts for a conference scheduling workflow of an example embodiment. At decision block 352, a query is processed. Does the letter generate a conference? If yes, the student corresponding to the letter is queued to schedule a conference (processing block 354). The user can select a particular student for whom a conference is scheduled (processing block 356). The user can specify: date, time, location, and optional notes for the conference (processing block 358). Should a conference notification be sent? (decision block 360). If yes, a conference notification is queued and printed in a nightly batch job (processing block 362). The conference status is updated to scheduled (processing block 364).

Referring to FIG. 6, processing continues at bubble B for the conference scheduling workflow of an example embodiment. At processing block 370, the workflow executes a nightly conference status batch job. Has the conference date passed? (decision block 372). If yes, the conference status is updated to 'To Be Closed' (processing block 374). The user can select 'To Be Closed' to close the conference to be closed. The user can also select a reason for the closure, and can add optional/required notes (processing block 376). The conference status is updated to 'Closed' (processing block 378). Processing terminates for the conference scheduling workflow of an example embodiment.

As described above, a user platform 141 can include a mobile device on which a mobile application (app) can be executed. An example embodiment 400, implemented as a mobile device app, can be used to support a mobile device user interface for the student attendance management system 200 of an example embodiment. It will be apparent to those of ordinary skill in the art that other embodiments can also be implemented as a web application (app) with one or more webpages or other types of user interfaces. A mobile version of an example embodiment provides a user-friendly interface from which the user can easily view the relevant school information from a mobile device. As described in more detail below, a mobile software application (app) embodying a mobile version of an example embodiment as described herein can be installed and executed on a mobile device, such as a smart phone, laptop computer, tablet device, or the like. In an example embodiment, a splash screen appears whenever the user opens or launches the mobile application on the mobile device. This splash screen displays a host logo and wallpaper image while opening the login screen or a live feed of processed school information.

User log-in functionality in the mobile app provides a user-friendly user interface in which the user provides the email address and password associated with the user account. If the user does not have an account, the user can create an account from this user interface. The process of creating a user account in an example embodiment is simple and only requires the user to provide the following information: name, surname, e-mail address, and password. By completing this information, the user can create an account and get access to processed school information.

Referring again to FIG. 1, the student attendance management system 200 of an example embodiment is also shown to include a user account management module 270. The user account management module 270 can be used to create and maintain a user account on the host site 110. The user account management module 270 can also be used to configure user settings, create and maintain a user/user profile on host site 110, and otherwise manage user data and operational parameters on host site 110. In the example embodiment described herein, a user can register as an identified user in order to share information, documents, communications, or other content. The registered user can enter their name, email address, and password. Once this information is entered, a user account is created and the user can share information, documents, communications, or other content.

Referring again to FIG. 1, the student attendance management system 200 of an example embodiment is shown to include an administrative management module 280. The administrative management module 280 can be used by an agent of the student attendance management system 200 to manage user accounts and to manage the student attendance management system. The administrative management module 280 can also be used to enforce privacy protections and content controls for users. Moreover, the administrative management module 280 can also be used to generate and/or process a variety of analytics associated with the operation of the student attendance management system 200. For example, the administrative management module 260 can generate various statistical models that represent the activity of the community of users and related districts, schools, students, and the like. These analytics can be shared, licensed, or sold to others.

Although the various user interface displays provided by the example embodiments described herein are nearly infinitely varied, several sample user interface displays and sequences are provided herein and in the corresponding figures to describe various features of the disclosed embodiments. These sample user interface displays and sequences are described herein and in the accompanying figures. It will be apparent to those of ordinary skill in the art that equivalent user interface displays and sequences can be implemented within the scope of the inventive subject matter disclosed and claimed herein.

Figure 7:
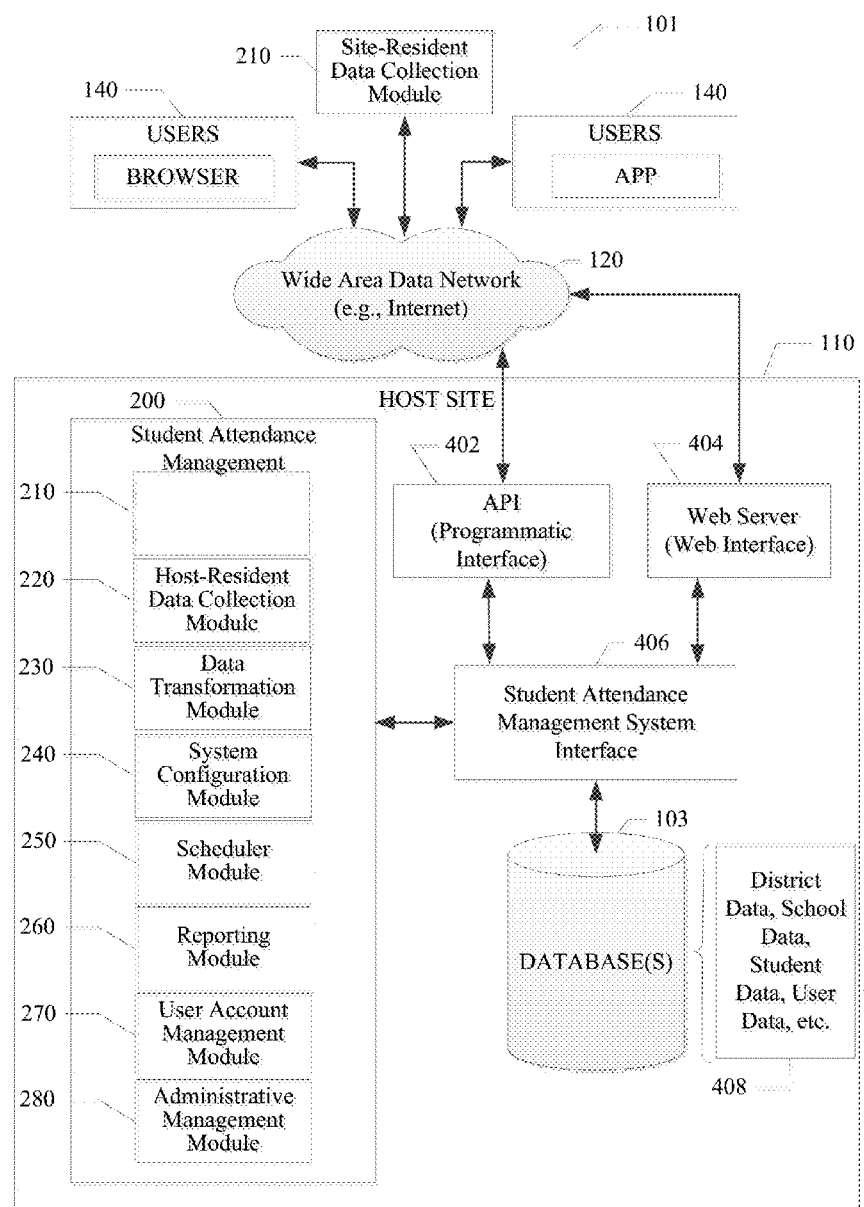
FIG. 7 illustrates another example embodiment of a networked system in which various embodiments may operate.

Referring now to FIG. 7, another example embodiment 101 of a networked system in which various embodiments may operate is illustrated. In the embodiment illustrated, the host site 110 is shown to include the student attendance management system 200. The student attendance management system 200 is shown to include the functional components 210 through 280, as described above. In a particular embodiment, the host site 110 may also include a web server 404, having a web interface with which users may interact with the host site 110 via a user interface or web interface. The host site 110 may also include an application programming interface (API) 402 with which the host site 110 may interact with other network entities on a programmatic or automated data transfer level. The API 402 and web interface 404 may be configured to interact with the student attendance management system 200 either directly or via an interface 406. The student attendance management system 200 may be configured to access a data storage device 103 and data 408 therein either directly or via the interface 406.

Figure 8:
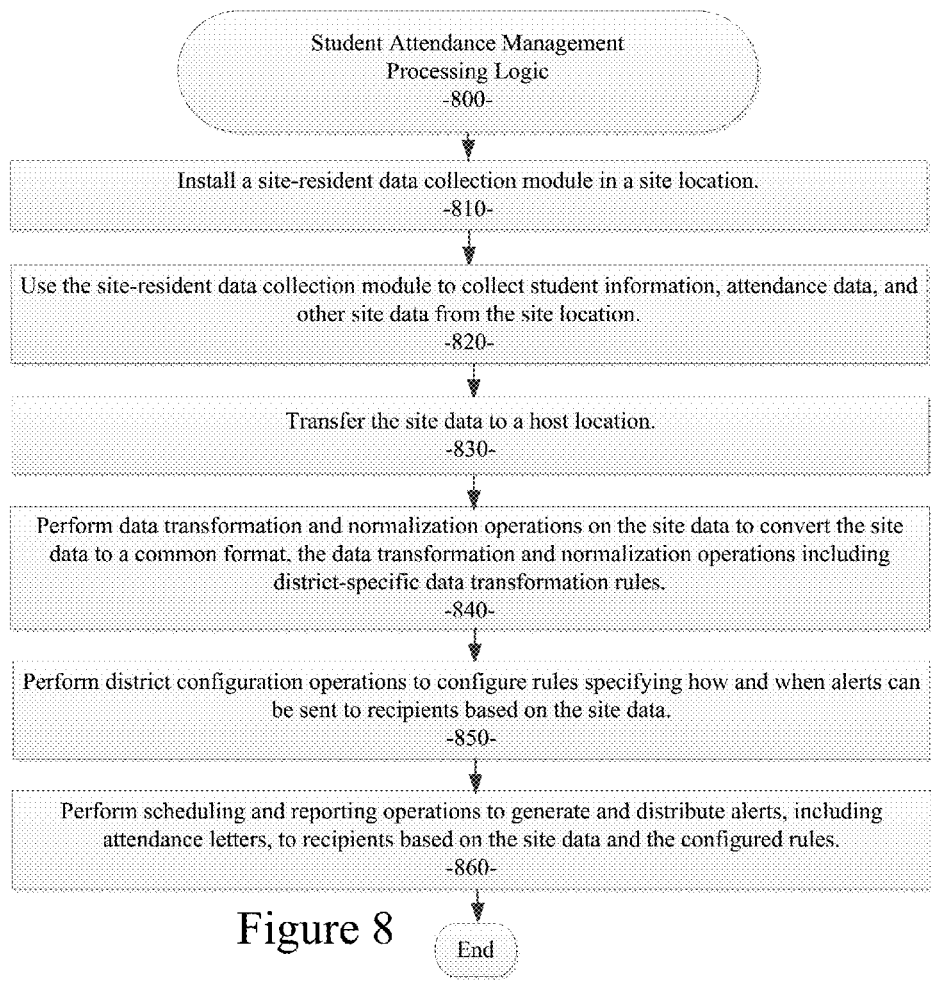
FIG. 8 is a processing flow chart illustrating an example embodiment of a method as described herein.

Referring now to FIG. 8, a processing flow diagram illustrates an example embodiment of a student attendance management system 200 as described herein. The method 800 of an example embodiment includes: installing a site-resident data collection module in a site location (processing block 810); using the site-resident data collection module to collect student information, attendance data, and other site data from the site location (processing block 820); transferring the site data to a host location (processing block 830); performing data transformation and normalization operations on the site data to convert the site data to a common format, the data transformation and normalization operations including district-specific data transformation rules (processing block 840); performing district configuration operations to configure rules specifying how and when alerts can be sent to recipients based on the site data (processing block 850); and performing scheduling and reporting operations to generate and distribute alerts, including attendance letters, to recipients based on the site data and the configured rules (processing block 860).

Figure 9:
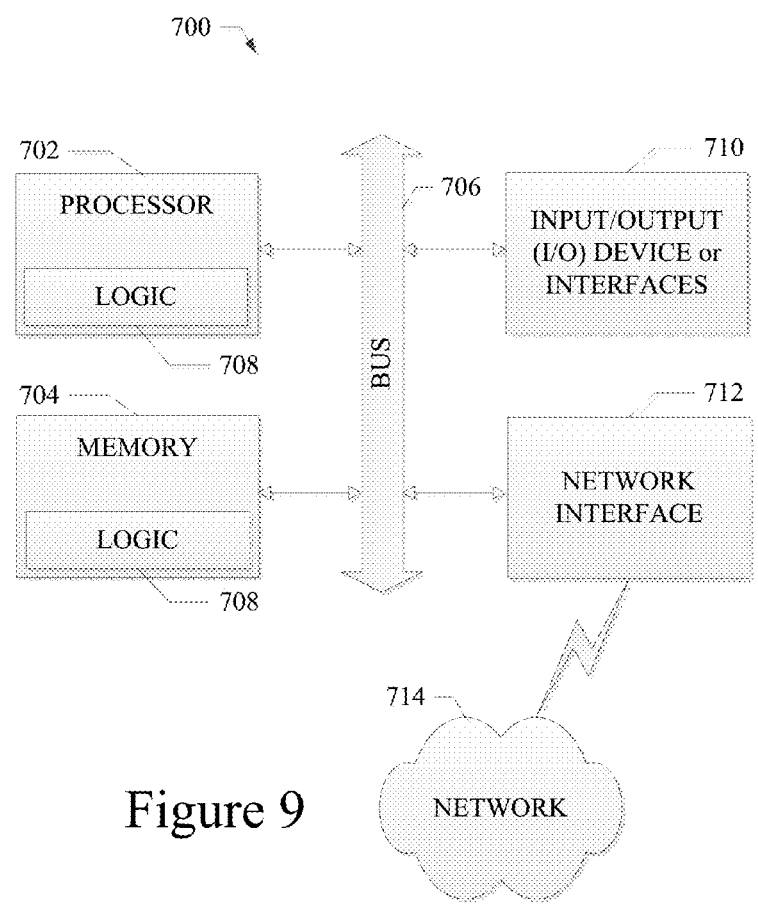
FIG. 9 shows a diagrammatic representation of machine in the example form of a computer system within which a set of instructions when executed may cause the machine to perform any one or more of the methodologies discussed herein.

FIG. 9 shows a diagrammatic representation of a machine in the example form of a stationary or mobile computing and/or communication system 700 within which a set of instructions when executed and/or processing logic when activated may cause the machine to perform any one or more of the methodologies described and/or claimed herein. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example stationary or mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The stationary or mobile computing and/or communication system 700 may further include various input/output (I/O) devices and/or interfaces 710, such as a monitor, touchscreen display, keyboard or keypad, cursor control device, voice interface, and optionally a network interface 712. In an example embodiment, the network interface 712 can include one or more network interface devices or radio transceivers configured for compatibility with any one or more standard wired network data communication protocols, wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the stationary or mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the stationary or mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    installing a site-resident data collection module in a site location, the site-resident data collection module including instructions executing within an executable environment of the site location, the site-resident data collection module further including a first data interface enabling data communication between the site-resident data collection module and a legacy data processing system of the site location, the site-resident data collection module being configured to dynamically determine database record structures and record attributes being used by the legacy system;
    running test data to confirm that the database record structures and record attributes being used by the legacy system have been properly determined by the site-resident data collection module;
    using the site-resident data collection module to collect site-specific information, including student attendance data and other site data, from the site location, the collection of the site-specific information from the site location including causing execution of instructions of the site-resident data collection module to access and retrieve data of the legacy system via the first data interface, the access and retrieval of data from the legacy system being based on the dynamically determined database record structures and record attributes;
    transferring the site-specific information to a host location via a data network, the site-resident data collection module further including a second data interface enabling data communication between the site-resident data collection module and the host location via the data network, the site-specific information being converted to a form of network transportable digital data prior to being transferred via the data network;
    performing, by a data processor at the host location and execution of a data transformation module, data transformation and normalization operations on the site-specific information, received via the second data interface and the data network, to convert the site-specific information to a common format, which is common across a plurality of different districts, the data transformation and normalization operations including district-specific data transformation rules to convert data of a specific district to the common format;

performing, by the data processor at the host location and execution of a district configuration module, district configuration operations to configure rules specifying how and when alerts can be sent to recipients based on the site-specific information; and performing, by the data processor at the host location and execution of scheduler and reporting modules, scheduling and reporting operations to generate and distribute alerts, including attendance letters, to recipients based on the site-specific information and the configured rules.

2. The method of claim 1 wherein the site location is a district office or a school.

3. The method of claim 1 wherein the site-resident data collection module is executed on the legacy system at the site location.

4. The method of claim 1 wherein the site-specific information is transferred to the host location via the Internet.

5. The method of claim 1 wherein the site-resident data collection module can dynamically determine database record structures and record attributes being used by the legacy system by validating and reviewing data structures and schemas being used in a site location database.

6. The method of claim 1 wherein the configured rules include rules to set different attendance triggers, letters, and contacts based on grade.

7. The method of claim 1 including suppressing or preventing a configured rule.

8. The method of claim 1 including generating, by use of the data processor at the site location, attendance letters, notifications, or other alerts according to a defined schedule and scheduling conferences based on prescribed rules.

9. The method of claim 1 including associating a unique student identifier for each student, the unique student identifier being unique for a particular student across all districts, schools, and locations serviced by a host system.

10. A system comprising:
a data processor;
a network interface, in data communication with the data processor, for communication on a data network; and
a student attendance management system, executable by the data processor, to:
cause installation of a site-resident data collection module in a site location, the site-resident data collection module including instructions executing within an executable environment of the site location, the site-resident data collection module further including a first data interface enabling data communication between the site-resident data collection module and a legacy data processing system of the site location, the site-resident data collection module being configured to dynamically determine database record structures and record attributes being used by the legacy system;
run test data to confirm that the database record structures and record attributes being used by the legacy system have been properly determined by the site-resident data collection module;
interface with the site-resident data collection module to collect site-specific information, including student attendance data and other site data, from the site location, the collection of the site-specific information from the site location including causing execution of instructions of the site-resident data collection module to access and retrieve data of the legacy system via the first data interface, the access and retrieval of data from the legacy system being based on the dynamically determined database record structures and record attributes;

cause transfer of the site-specific information to a host location via the data network, the site-resident data collection module further including a second data interface enabling data communication between the site-resident data collection module and the host location via the network interface and the data network, the site-specific information being converted to a form of network transportable digital data prior to being transferred via the data network;

perform, at the host location by execution of a data transformation module, data transformation and normalization operations on the site-specific information, received via the second data interface and the data network, to convert the site-specific information to a common format, which is common across a plurality of different districts, the data transformation and normalization operations including district-specific data transformation rules to convert data of a specific district to the common format;

perform, at the host location by execution of a district configuration module, district configuration operations to configure rules specifying how and when alerts can be sent to recipients based on the site-specific information; and perform, at the host location by execution of scheduler and reporting modules, scheduling and reporting operations to generate and distribute alerts, including attendance letters, to recipients based on the site-specific information and the configured rules.

11. The system of claim 10 wherein the site location is a district office or a school.

12. The system of claim 10 wherein the site-resident data collection module is executed on the legacy system at the site location.

13. The system of claim 10 wherein the site-specific information is transferred to the host location via the Internet.

14. The system of claim 10 wherein the site-resident data collection module can dynamically determine database record structures and record attributes being used by the legacy system by validating and reviewing data structures and schemas being used in a site location database.

15. The system of claim 10 wherein the configured rules include rules to set different attendance triggers, letters, and contacts based on grade.

16. The system of claim 10 being further configured to suppress or prevent a configured rule.

17. The system of claim 10 being further configured to generate, by use of the data processor at the site location, attendance letters, notifications, or other alerts according to a defined schedule and scheduling conferences based on prescribed rules.

18. The system of claim 10 being further configured to associate a unique student identifier for each student, the unique student identifier being unique for a particular student across all districts, schools, and locations serviced by a host system.

19. A non-transitory machine-useable storage medium embodying instructions which, when executed by a machine, cause the machine to:

cause installation of a site-resident data collection module in a site location, the site-resident data collection module including instructions executing within an executable environment of the site location, the site-resident data collection module further including a first data interface enabling data communication between the site-resident data collection module and a legacy data processing system of the site location, the site-resident data collection module being configured to dynamically determine database record structures and record attributes being used by the legacy system;

run test data to confirm that the database record structures and record attributes being used by the legacy system have been properly determined by the site-resident data collection module;

interface with the site-resident data collection module to collect site-specific information, including student attendance data and other site data, from the site location, the collection of the site-specific information from the site location including causing execution of instructions of the site-resident data collection module to access and retrieve data of the legacy system via the first data interface, the access and retrieval of data from the legacy system being based on the dynamically determined database record structures and record attributes;

cause transfer of the site-specific information to a host location via the data network, the site-resident data collection module further including a second data interface enabling data communication between the site-resident data collection module and the host location via the network interface and the data network, the site-specific information being converted to a form of network transportable digital data prior to being transferred via the data network;

perform, at the host location by execution of a data transformation module, data transformation and normalization operations on the site-specific information, received via the second data interface and the data network, to convert the site-specific information to a common format, which is common across a plurality of different districts, the data transformation and normalization operations including district-specific data transformation rules to convert data of a specific district to the common format;

perform, at the host location by execution of a district configuration module, district configuration operations to configure rules specifying how and when alerts can be sent to recipients based on the site-specific information; and perform, at the host location by execution of scheduler and reporting modules, scheduling and reporting operations to generate and distribute alerts, including attendance letters, to recipients based on the site-specific information and the configured rules.

20. The machine-useable storage medium of claim 19 wherein the site location is a district office or a school.

* * * * *